United States Patent [19]

Bingaman et al.

[11] Patent Number: 6,000,031

[45] Date of Patent: Dec. 7, 1999

[54] METHOD AND SYSTEM FOR COLLECTING AND AUTHENTICATING UPDATES TO A NETWORK-BASED DIRECTORY SERVICE

[75] Inventors: Keith B. Bingaman, Randolph; Gerald C. Vogel, Berkeley Heights, both of N.J.

[73] Assignee: AT&T Corp, New York, N.Y.

[21] Appl. No.: 08/847,068

[22] Filed: May 1, 1997

[51] Int. Cl.[6] .............................. G06F 11/00; H04M 3/42
[52] U.S. Cl. .............................................. 713/200; 379/88
[58] Field of Search ........................ 395/186, 182.11, 395/182.18, 183.07, 183.19, 200; 379/88, 93.14, 67, 89, 95, 355; 380/4, 23, 48; 714/4, 18, 20, 47, 48; 713/200, 201

[56] References Cited

U.S. PATENT DOCUMENTS

| | | | |
|---|---|---|---|
| 5,483,586 | 1/1996 | Sussman | 379/201 |
| 5,552,897 | 9/1996 | Mandelbaum et al. | 358/400 |
| 5,717,738 | 2/1998 | Gammel | 379/67 |
| 5,727,046 | 3/1998 | Almulla | 379/88 |
| 5,734,718 | 3/1998 | Prafulichandra | 380/4 |
| 5,740,230 | 4/1998 | Vaudreuil | 379/88 |
| 5,740,231 | 4/1998 | Cohn et al. | 379/89 |
| 5,745,559 | 4/1998 | Weir | 379/199 |

*Primary Examiner*—Robert W. Beausoliel, Jr.
*Assistant Examiner*—Nadeem Iqbal

[57] ABSTRACT

A method and system are disclosed for authenticating on-line updates to listings maintained by a network-based directory service. An exemplary method for authenticating updates submitted on-line includes: (1) receiving an on-line update for a listing; (2) receiving origination information associated with a telephone call initiated by a user of a phone line corresponding to the listing; and (3) detecting a match between the origination information and at least a portion of the listing to authenticate the update. In one embodiment of the present invention, the origination information is a telephone number common to both the phone line from which the user is calling and the listing.

20 Claims, 2 Drawing Sheets

METHOD AND SYSTEM FOR COLLECTING AND AUTHENTICATING UPDATES TO A NETWORK-BASED DIRECTORY SERVICE

TECHNICAL FIEELD

This invention relates generally to a network-based directory service, and more particularly, to a method and system for collecting and authenticating on-line updates to listings maintained by the directory service.

BACKGROUND

It is known in the art to operate a network-based directory service—i.e., an on-line "white pages" which can be accessed via a client application, such as a world-wide-web ("WWW") browser. Such directories contain approximately 100 million residential and business listings. These listings typically include name, address and telephone number information, together with business category information for non-residential listings. The operator of the directory service usually obtains the data for these listings from a data provider.

Users of the directory service are presently able to add, remove, and change (i.e., update) their listings on-line. To effect an on-line update, a user is required to provide the directory service, at the time of the update, with an e-mail address to which the service can thereafter send a message confirming the update. Once the user provides an e-mail address, the directory service will generate a new record for the listing in accordance with the update request. However, this method of update authentication is not entirely satisfactory, and indeed, is prone to fraud because e-mail addresses are (1) ephemeral, (2) not easily traced to an individual owner, and (3) not necessarily associated with the listing being updated. As such, fraudulent updates can easily be effected by users other than the owner of the listing.

Therefore, a method and system are needed to provide owners of directory listings with an opportunity to go on-line and update information corresponding to their listings in a manner that is efficient, error free, and resistant to fraud.

SUMMARY OF INVENTION

The above-identified problems are solved and a technical advance is achieved in the art by providing a method and system for authenticating on-line updates to listings in a network-based directory service. An exemplary method for authenticating on-line updates includes: (1) receiving an on-line update for a listing; (2) receiving origination information associated with a telephone call initiated by a user of a phone line corresponding to the listing; and (3) detecting a match between said origination information and at least a portion of the listing to authenticate the update.

In accordance with the present invention, the aforementioned problems associated with using an e-mail address to authenticate an update are eliminated; an individual with access to the phone line associated with the listing being updated is likely to be either the owner of the listing or some other individual authorized to confirm the update.

Other and further aspects of the present invention will become apparent during the course of the following description and by reference to the attached drawings.

DETAILED DESCRIPTION

Figure 1:
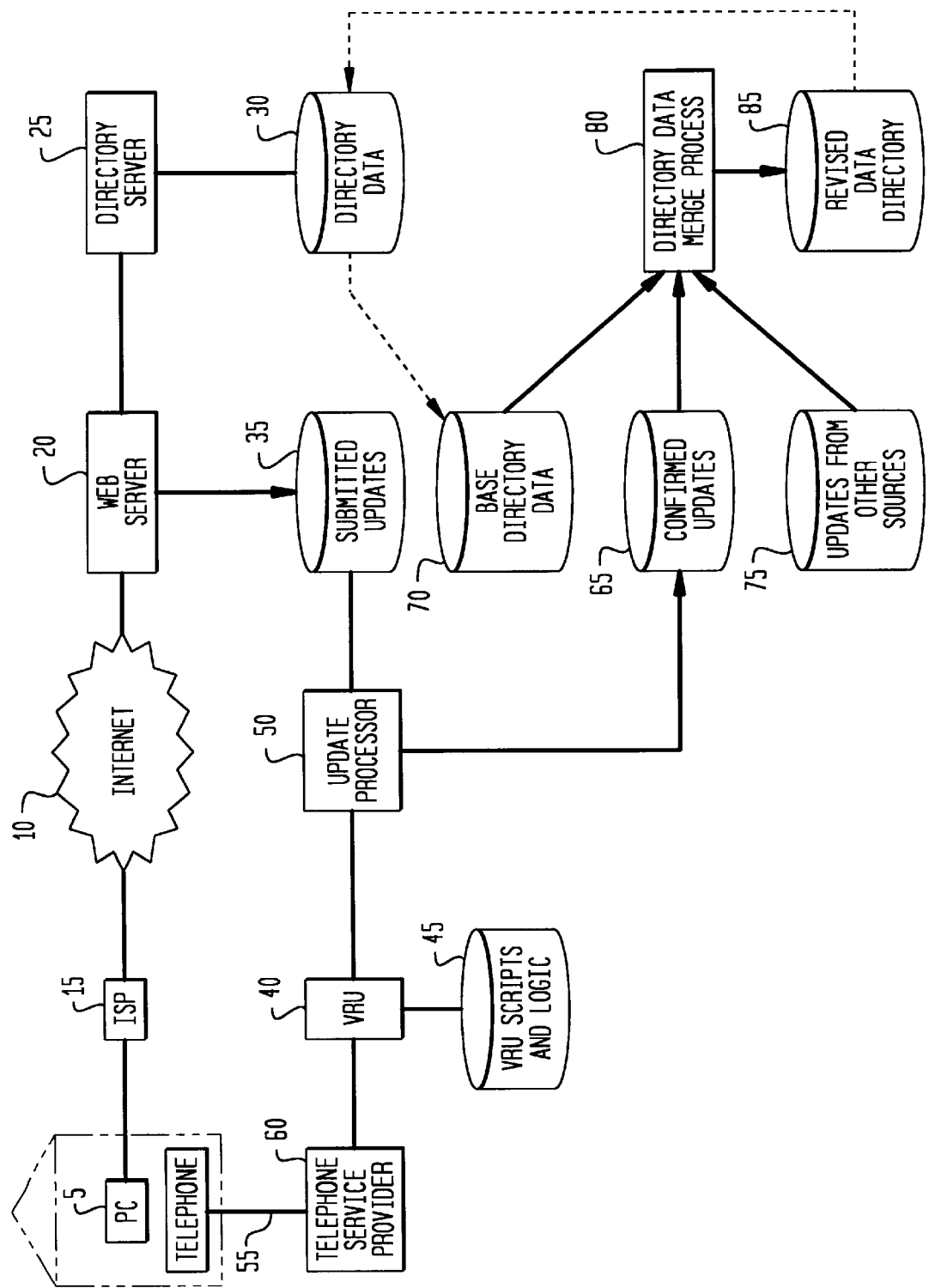
FIG. 1 is a block diagram illustrating one embodiment of the present invention.

Referring now to the drawings, wherein like reference numerals refer to like parts, FIG. 1 illustrates one embodiment of the present invention. In this embodiment, the network-based directory service update process comprises four phases: (1) update collection; (2) update confirmation; (3) update application; and (4) update maintenance.

Update Collection:

As shown in FIG. 1, a user of a personal computer 5 is provided access to the internet 10 via an internet service provider 15 and can thereby access a web page of a network-based directory service. The web page is maintained by a web server 20 and contains various forms created using a hypertext mark-up language. These forms provide the user with a means of interacting with the network-based directory service. In particular, the user can submit queries, select listings, and update information corresponding to the listings selected. A listing can include a wide variety of information including, but not limited to, names, addresses, telephone numbers, fax numbers, cellular phone numbers, e-mail addresses, business addresses, hours of operation, etc.

The web server 20 responds to a user's selection of a directory listing by obtaining the listing and the information associated therewith from directory server 25. It is to be understood that the user interface functionality of web server 20 could, alternatively, be provided by directory server 25, in which case a separate web server would not be required. The directory server 25, in turn, retrieves this information from database 30. The operation of database 30 and the provisioning thereof with the most up-to-date information for each directory listing will be described in detail below.

The web server 20 allows the user to both create a new listing and to either delete or revise a selected listing. The creation of a new listing, or the deletion or revision of information associated with a pre-existing listing is referred to hereinafter as "an update". The web server 20 provides the user with an opportunity to verify that the update is correct (e.g., that the update does not contain any typographical errors). The web server 20 also audits the update for basic validity. For example, the web server 20 may verify that the correct number of digits for a telephone number has been entered by a user or, that the state and city information for the listing are consistent with the area code of the telephone number entered.

Once the user has verified that the update is correct, the web server 20 time stamps the update (i.e., the current time and date are added to the user-supplied information) and transmits it to database 35 where it is stored for a predetermined period of time pending confirmation by the user. The web server 20 requests the user to call a designated telephone number (either a toll-free number or a "900" number, as the update service may be either free or paid for by the user) from the phone line 55 associated with the listing being updated in order to confirm the update.

Update Confirmation:

When the user calls the designated number to confirm his update, the user is connected to voice response unit (VRU) 40, which, in turn, is coupled to a script database 45 and an update processor 50. The update processor 50 receives the telephone number corresponding to the line 55 from which the user is calling. The telephone number can be transmitted to the processor 55 in any number of ways including, but not limited to, via a calling line identification service provided by telephone service provider 60. Moreover, the telephone number transmitted to the processor 50 may be the automatic number identification (ANI) corresponding to the line 55 from which the user is calling, rather than the calling party number (CPN) corresponding to same.

The processor 50 then determines whether an update is pending for line 55 by comparing the telephone number corresponding to line 55 against the telephone numbers of all updates pending in database 35. The processor 50 provides the VRU 40 with the results of this comparison.

If it is determined that an update is not pending for line 55, the VRU 40 will play a pre-recorded announcement retrieved from database 45 to inform the user of such and will thereafter terminate the call. The Conversant™ Voice System, manufactured by AT&T, is one unit which can be used to carry out the functions of VRU 40. Alternatively, if no updates are pending, the VRU 40 may refer the user to an attendant who can provide further assistance. For example, the attendant may be able to accept updates over the phone.

If an update is pending for line 55, the VRU 40 will play a pre-recorded announcement to inform the user of the update and to determine whether the user desires to confirm or cancel it. The VRU 40 will inform the user of the pending update by announcing the time-stamp for the update. Optionally, the VRU 40 may also announce the updated listing to the user. In cases where more than one update is pending for a given line 55, the use of the time-stamp alone or in combination with the announcement of the updated listing will (1) assist the user in determining which update is being confirmed or canceled and (2) prevent the user from inadvertently confirming a fraudulent update submitted by another user.

The user can then confirm or cancel the pending update by pressing the appropriate touch-tone button on the keypad of his telephone (e.g., "1" to confirm, "2" to cancel). Optionally, the user may also be required to enter a code number provided by the web server 20 (and stored with the update in database 35) when the update was submitted on-line by the user. This feature further prevents the user from inadvertently confirming an update submitted by an unauthorized individual; the user who submitted the update is the only person with the code number for the update.

In any event, the update processor 50 deletes canceled updates from database 35 and forwards confirmed updates to database 65.

Update Application:

As shown in FIG. 1, database 70 stores base directory data. This data is initially purchased from a data provider, such as Database America, and is thereafter merged with confirmed updates (database 65) and updates from sources other than the network-based directory service web-page (database 75), such as the U.S. Mail or live attendants, to generate revised directory data. The revised directory data is stored in database 85 and is made available to. the directory server 25, and thus, to users of the network-based directory service, via database 30.

The process 80 of merging the updates into the directory database 30 may be continuous (thus allowing immediate access to confirmed updates) or periodic (thereby allowing access to confirmed updates when the current merge cycle is complete). In either case, the directory data in database 30 becomes the base directory data in database 70 at the commencement of the merge process.

Update Maintenance:

Periodically (e.g., once each day), the update processor 50 will examine the updates pending in database 35 and will discard those that were not confirmed within some reasonable amount of time (e.g., 5 days) after being submitted. In addition, the update processor 50 may replace a pending update request with a new update request for the same listing, if the new request is submitted before the existing request is confirmed.

The many features and advantages of the present invention are apparent from the detailed specification, and thus, it is intended by the appended claims to cover all such features and advantages of the invention which fall within the true spirit and scope of the present invention.

Figure 2:
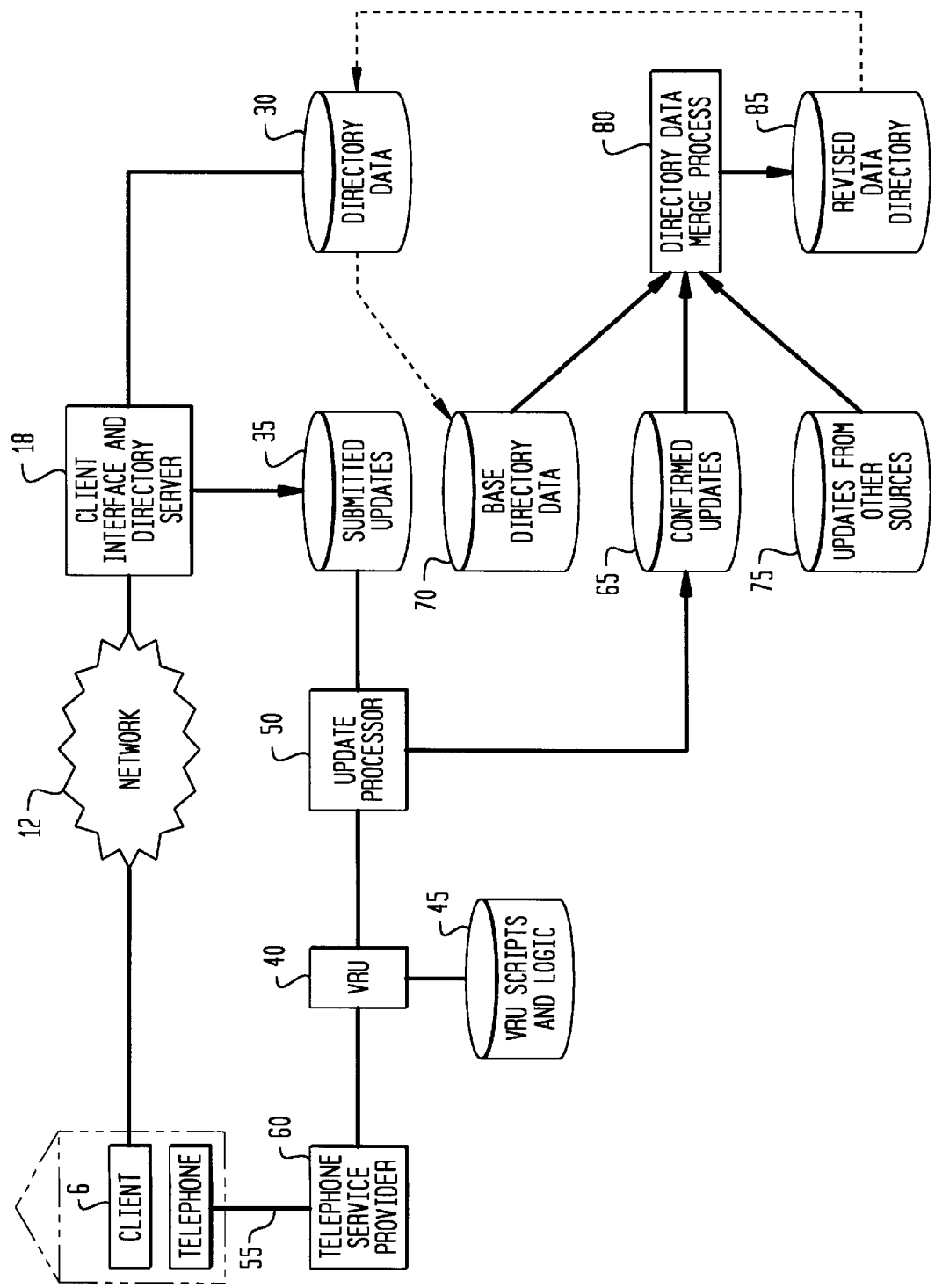
FIG. 2 is a block diagram illustrating an alternate embodiment of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, FIG. 1 illustrates one embodiment of the present invention wherein client access to the directory service is via a computer communications network such as the WWW. However, as shown in FIG. 2, access to the directory service may be via any network 12 including, but not limited to, the WWW. For example, network 12 may be a telephone network, in which case the client 6 would access the directory service by direct dialing server 18 using a modem. The web server 20 shown in FIG. 1 would therefore not be required in the embodiment of FIG. 2. Rather, server 18 alone, or in combination with a client application, would provide the necessary client interface functionality. The operation of the embodiment of FIG. 2 would otherwise be identical to the operation of the embodiment shown in FIG. 1.

We claim:

1. A method for authenticating on-line updates to listings in a network-based directory, comprising the steps of:

receiving an on-line update for a listing;

receiving origination information associated wiffi a telephone call initiated from a phone line corresponding to said listing; and detecting a match between said origination information and at least a portion of said listing to authenticate said update.

2. The method of claim 1 wherein said origination information is a telephone number.

3. The method of claim 1 wherein said origination information is an automatic number identification (ANI).

4. The method of claim 1, further comprising the steps of:

time stamping said update;

storing said time stamp; and after said step of detecting, announcing said time stamp to said user.

5. The method of claim 1 further comprising the step of:

after said step of detecting, announcing said update to said user.

6. The method of claim 1 further comprising the step of:

after said step of detecting, requesting said user to enter a predetermined code to confirm said update.

7. A system for authenticating on-line updates to listings in a network-based directory service, comprising:

a memory device for storing an on-line update for a listing:

a processor in communication with said memory device, said processor configured to receive origination information associated with a telephone call initiated from a phone line corresponding to said listing and detecting a match between said origination information and at least some portion of said listing to authenticate said update.

8. The system of claim 7 wherein said origination information is a telephone number.

9. The system of claim 7 wherein said origination information is an automatic number identification (ANI).

10. The system of claim 7, wherein said update includes a time stamp and further comprising:

a voice response unit for announcing said time stamp to said user after said processor has detected said match.

11. The system of claim 7 further comprising:

a voice response unit for announcing said update to said user after said processor has detected said match.

12. The system of claim 7 further comprising:

a voice response unit for requesting said user to enter a predetermined code to confirm said update after said processor has detected said match.

13. A system for authenticating on-line updates to listings in a network-based directory service, comprising:

means for receiving an on-line update for a listing;

means for receiving origination information associated with a telephone call initiated from a phone line corresponding to said listing; and means for detecting a match between said origination information and at least a portion of said listing to authenticate said update.

14. The system of claim 13 wherein said origination information is a telephone number.

15. The system of claim 13 wherein said origination information is an automatic number identification (ANI).

16. The system of claim 13, further comprising:

means for time stamping said update;

means for storing said time stamp; and means for announcing said time stamp to said user after said means for detecting has detected said match.

17. The system of claim 13, further comprising:

means for announcing said update to said user after said means for detecting has detected said match.

18. The system of claim 13 further comprising:

means for requesting said user to enter a predetermined code to confirm said update after said means for detecting has detected said match.

19. The method of claim 1 wherein the step of receiving includes receiving an on-line update for the listing from a user of a computer via the internet.

20. The method of claim 1 wherein the step of receiving includes receiving an on-liie update for the listing from a user of a computer via the public switched telephone network.

* * * * *